United States Patent
Brevick et al.

(10) Patent No.: US 9,879,774 B2
(45) Date of Patent: Jan. 30, 2018

(54) TRANSMISSION WITH OUTPUT TORQUE SENSOR

(71) Applicant: Ford Global Technologies, LLC, Dearborn, MI (US)

(72) Inventors: John Edward Brevick, Livonia, MI (US); Steven Anatole Frait, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 15/018,904

(22) Filed: Feb. 9, 2016

(65) Prior Publication Data

US 2017/0227114 A1    Aug. 10, 2017

(51) Int. Cl.
*F16H 57/08* (2006.01)
*F16H 1/28* (2006.01)
*G01L 1/16* (2006.01)
*G01L 3/10* (2006.01)

(52) U.S. Cl.
CPC ............. *F16H 57/082* (2013.01); *F16H 1/28* (2013.01); *G01L 1/165* (2013.01); *G01L 3/10* (2013.01)

(58) Field of Classification Search
None
See application file for complete search history.

(56) References Cited

U.S. PATENT DOCUMENTS

| | | | | |
|---|---|---|---|---|
| 4,222,290 A | * | 9/1980 | Helmer | F16H 57/0427 475/159 |
| 5,470,286 A | * | 11/1995 | Fan | F16H 57/082 475/331 |
| 5,480,362 A | * | 1/1996 | Tanaka | F16H 57/0479 475/325 |
| 5,658,215 A | * | 8/1997 | Premiski | F16H 57/082 29/509 |
| 7,111,611 B1 | | 9/2006 | Lyon | |
| 7,392,714 B2 | | 7/2008 | Maguire et al. | |
| 7,395,724 B2 | | 7/2008 | Bunyer | |

(Continued)

FOREIGN PATENT DOCUMENTS

| | | |
|---|---|---|
| CN | 102288339 A | 12/2011 |
| JP | 2013174562 A | 9/2013 |

OTHER PUBLICATIONS

Kalinin, Victor, Wireless Physical SAW Sensors for Automotive Applications, Transense Technologies plc, Bicester, Oxon, UK, pp. 1-10.

(Continued)

*Primary Examiner* — Justin Holmes
(74) *Attorney, Agent, or Firm* — James Dottavio; Brooks Kushman P.C.

(57) ABSTRACT

An output shaft of a transmission is fixed to a planetary gearset carrier. Output torque is measured via a surface acoustic wave sensor affixed to a face of the carrier between two adjacent planet gears and radially inside a weld joining the carrier face to an opposite carrier face. In this location, the level of strain at typical transmission output torques produces a level of strain within the measuring range of a surface acoustic wave sensor. The sensor may be powered and signals communicated across an air gap defined by signal rings. Due the stable position and orientation of the carrier, a small, consistent air gap is possible.

14 Claims, 3 Drawing Sheets

(56) References Cited

U.S. PATENT DOCUMENTS

2007/0028692 A1    2/2007  Liu
2010/0304918 A1*  12/2010  Burgman .............. F16H 57/082
                                                                475/331

OTHER PUBLICATIONS

Hashimoto, S. et al., Development of a Torque Measurement Method on a Rotating Shaft Using a Battery-Less Sensor, Paper No. 2012-01-0909, DOI: 10.4271/2012-01-0909, Apr. 16, 2012, pp. 1-8.
Gierut, Joseph, et al., Automotive Powertrain & Chassis Torque Sensor Technology, Honeywell, Freeport, IL, 2005, p. 1-6.

* cited by examiner

TRANSMISSION WITH OUTPUT TORQUE SENSOR

TECHNICAL FIELD

This disclosure relates to the field of motor vehicle transmissions. More particularly, the disclosure pertains to transmission with a Surface Acoustic Wave (SAW) output torque sensor.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

The transmission speed ratio may be controlled by adjusting the pressure of hydraulic fluid supplied to various clutches. During a shift between speed ratios, a controller may reduce the hydraulic pressure to an off-going clutch and, in a coordinated manner, increase the hydraulic pressure to an on-coming clutch. If the pressures are not carefully coordinated, the shift feels rough to vehicle occupants. A number of noise factors such as environmental conditions, component wear, and part-to-part variation influence the transmission response to controller signals. In order to consistently achieve excellent shift quality, the controller may rely closed loop control using one or measurements of transmission response as feedback signals during a shift. Measurement of transmission output torque is particularly useful.

SUMMARY OF THE DISCLOSURE

A planetary gearset includes a carrier, a plurality of planet gears, a ring gear, a sun gear, and a surface acoustic wave sensor. The carrier includes a rear plate welded to a front plate. The rear plate and the front plate support a plurality of planet shafts. The planet gears are supported for rotation about the planet shafts. The ring gear and sun gear are each in continuous meshing engagement with each of the planet gears. The surface acoustic wave sensor is mounted to the rear plate between two adjacent planet shafts on a side opposite from the front plate. In this location, the level of strain is suitable for accurate detection with the surface acoustic wave sensor. This characteristic is further enhanced if the sensor is mounted radially inside the weld joining the front plate to the rear plate. The planetary gearset may further include a first signal ring mounted to the rear plate and in electrical communication with the sensor. The first signal ring may be configured to communicate across an air gap to a second signal ring that is fixed to a non-rotating member such as a transmission case. Due to the stable orientation and axial position of the carrier, the air gap has a constant thickness even as the carrier rotates and transmits torque, increasing the reliability of signal transmission. An output shaft may be fixed to the rear plate, in which case the sensor may be used to determine transmission output torque.

A transmission includes a planetary gearset, a surface acoustic wave sensor, and first and second signal rings. A carrier of the planetary gearset is supported for rotation with respect to a transmission housing. The surface acoustic wave sensor is affixed to the carrier. For example, the sensor may be mounted between adjacent planet gears. The first sensor ring is supported for rotation with the carrier. For example, it may be mounted directly to the carrier or mounted to the sensor. The second sensor ring is fixed to the housing. The two rings define an air gap having a constant thickness. This is possible because, during transmission operation, the axis of rotation of the carrier does not vary and the axial position of the carrier does not vary relative to the housing. The second signal ring receives signals from the sensor via the first ring and the air gap. An output shaft may be fixedly coupled to the carrier, in which case strain detected by the sensor may be used to accurately estimate transmission output torque. A controller may utilize these signals to adjust signals to a valve body to control the transmission.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
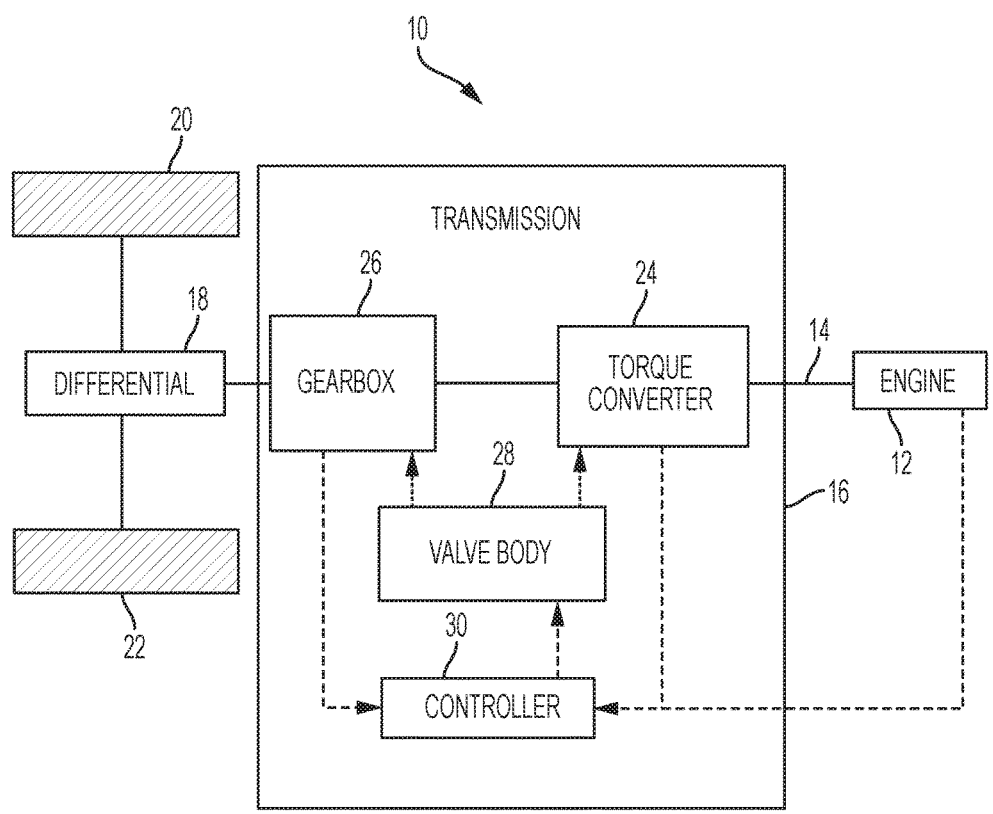
FIG. 1 is schematic diagram of a vehicle powertrain.

FIG. 1 illustrates a vehicle powertrain system 10. Mechanical power flow connections are indicated with solid bold lines while the flow of hydraulic fluid is indicated with dotted lines. Electrical control signals are indicated by bold dashed lines. An internal combustion engine 12 drives a crankshaft 14 which supplies input power to transmission 16. The transmission 16 adjusts the speed and torque and delivers the power to differential 18. Differential 18 divides the power between left and rights wheels 20 and 22 while allowing slight speed differences as the vehicle turns a corner.

Within transmission 16, the speed and torque are adjusted by two components, torque converter 24 and gearbox 26. Torque converter 24 includes an impeller and turbine that transmit power hydro-dynamically whenever the impeller rotates faster than the turbine. It may also include a stator that multiplies the torque. The torque converter may also include a bypass clutch that, when engaged, transmits power mechanically from the impeller to the turbine without the parasitic losses associated with hydro-dynamic power transfer. Gearbox 26 includes gearing and shift elements arranged such that engaging various subsets of the clutches establish various power flow paths. The different power flow paths have different speed ratios.

Valve body 28 supplies fluid to torque converter 24 and gearbox 26 at controlled pressures to control the torque capacity of shift elements. The valve body also supplies fluid to the hydro-dynamic chamber of torque converter 24 and supplies fluid for lubrication to gearbox 26. Controller 30 sends electrical signals to solenoids within valve body 28 to adjust the various controlled pressures. Controller 30 determines what pressures to command based on a number of input signals. These input signals may include signals from engine 12, torque converter 24, and gearbox 26. The input signals may also include signals from a driver operated accelerator pedal and a shift lever (not shown).

Among the most useful signals is an indication of transmission output torque. Several types of torque sensors are known. Most types of torque sensors operate best if placed on a section of shaft through which the torque of interest is transmitted. For example, output torque sensors are generally located on the output shaft. Often, it is necessary to mount any torque sensor on a section of the shaft that is sufficiently long and sufficiently separated from components such as gears that impact the torque. Consequently, it may be necessary to lengthen the shaft in order to add a torque sensor, resulting in an increase in the overall length of the transmission. While additional transmission length may pose few problems in some vehicle applications, it is critical in other vehicle applications.

One technology for measuring shaft torque is a surface acoustic wave (SAW) strain sensor. The strain in certain transmission components is proportional to torque transmitted by the component. For example, the strain on the surface of a long shaft is proportional to the torque transmitted by the shaft. SAW sensors are most accurate for sensing moderate levels of strain. The strain on the surface of an output shaft of a transmission is too high for accurately measuring typical transmission output shaft torques. Therefore, previous attempts to utilize SAW sensors as transmission output torque sensors have modified a region of the output shaft to locally reduce the strain near the sensor. For example, the sensor may be mounted to a post that sticks out radially from the shaft. Alternatively, a groove may be formed into the shaft around the sensor. These shaft modifications result in a larger overall shaft diameter than otherwise necessary.

Figure 2:
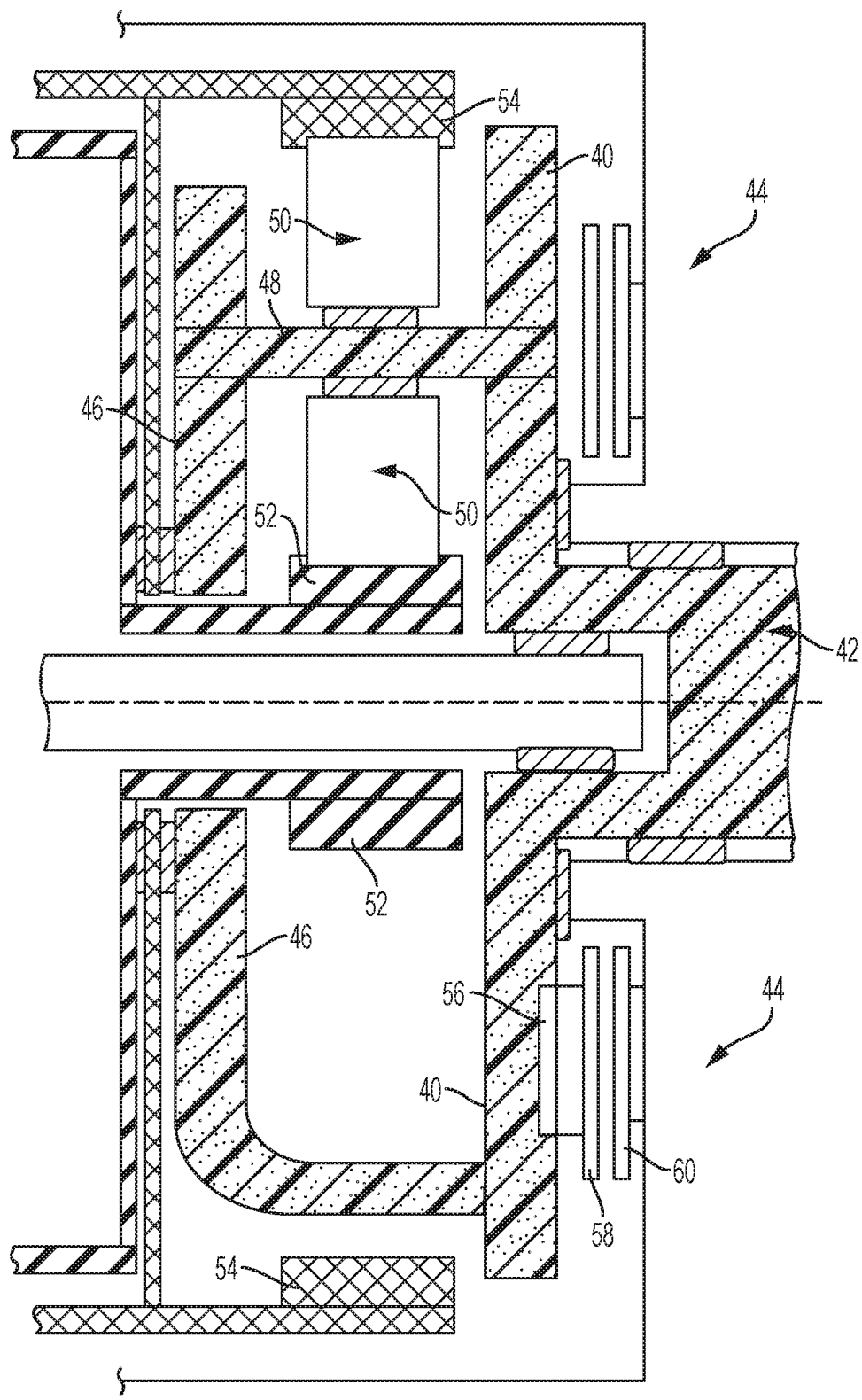
FIG. 2 is a cross section of a planetary gear set with a Surface Acoustic Wave (SAW) strain sensor configured to measure torque.

FIG. 2 illustrates a cross section of a planetary gear set with a SAW sensor mounted to the planetary carrier. The top half of FIG. 2 is a cross section through a planet gear while the bottom half of FIG. 2 is a cross section between planet gears. A rear plate 40 of the carrier is fixed to output shaft 42. They may be integrally formed, splined, welded, etc. The output shaft 42 and rear plate 40 are supported for rotation with respect to transmission case 44 by bearings. A front plate 46 of the carrier is welded to the rear plate at several circumferential locations between the planet gears as shown on the bottom of FIG. 2. A plurality of planet shafts 48 are fixed between the front plate 46 and the rear plate 40 at regularly spaced circumferential intervals. A plurality of planet gears 50 are supported for rotation about the planet shafts 48 by bearings. A sun gear 52 and a ring gear 54 are in continuous meshing engagement with each of the planet gears. Thrust bearings axially locate the sun and ring with respect to the carrier.

A SAW strain sensor 56 is mounted to the rear face of rear plate 40. The sensor is mounted approximately midway between two of the planet shafts 48 and at approximately the same radial distance from the centerline as the planet shafts. Optionally, additional SAW sensors may be mounted between other pairs of adjacent planet shafts. In some cases, the rear plate may include features to counteract the mass of the sensor to ensure that the carrier is properly balanced. A rotating signal ring 58 is also fixed for rotation with the carrier. For example, rotating signal ring 58 may be fixed directly to SAW sensor 56 or mounted to the rear plate separately. A stationary signal ring 60 is mounted to transmission case 44 adjacent to rotating signal ring 58. A small air gap separates rotating signal ring 58 from stationary signal ring 60. The power to operate sensor 56 is transmitted across the air gap from ring 60 to ring 58 and then conducted to sensor 56 by circuitry on rotating signal plate 58. Similarly, output signals from sensor 56 are transmitted from rotating signal ring 58 to stationary signal ring 60 across the air gap.

Figure 3:
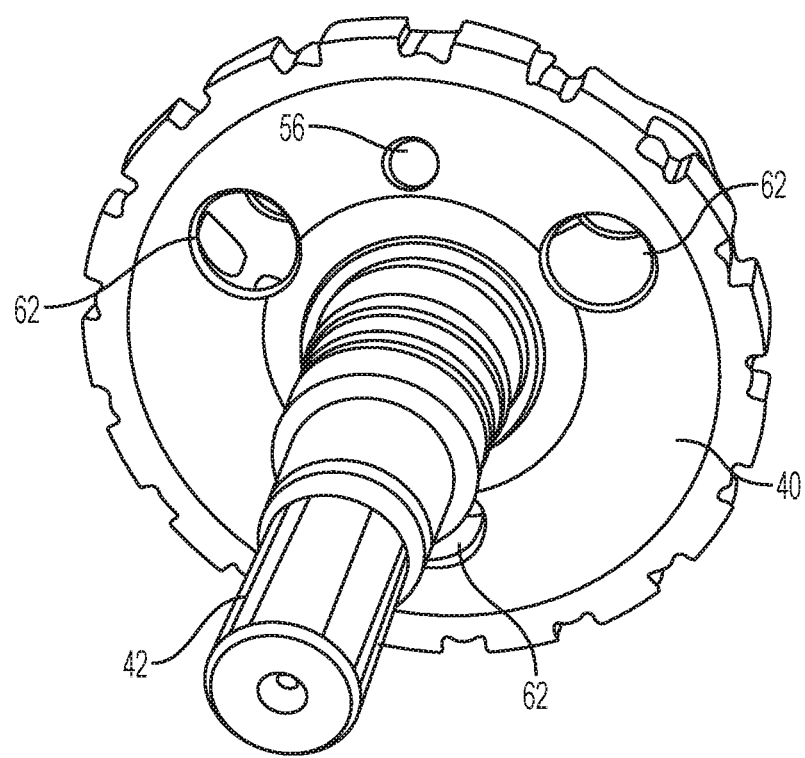
FIG. 3 is a pictorial view of the carrier of the planetary gear set of FIG. 2.

FIG. 3 is a pictorial view of the carrier and output shaft of FIG. 2. During assembly of the planetary gear set, a planet shaft 48 is inserted into each of the holes 62. A portion of the torque exerted on the carrier by the ring gear and sun gear is transmitted through the planet gears and the planet shafts to the edges of these holes. The remainder of the torque is transmitted to the front plate and then to the rear plate 40 through the welded joints. SAW sensor 56 is mounted to a rear face of the rear plate 40 approximately midway between two of the holes 62 and at approximately the same radial distance from the centerline. This places the SAW sensor closer to the centerline than the welded joints between the rear plate and the front plate. At typical transmission output torque levels, the strain in this location is suitable for a SAW strain sensor.

Placing a SAW strain sensor in this location offers various advantages relative to other potential torque sensor locations in a transmission. Locating a torque sensor on a shaft generally leads to an increase in transmission length. Mounting the sensor to a face of carrier that is adjacent to fixed structure is often feasible with little or no increase in transmission length. As discussed previously, the strain on the surface of an output shaft is not suitable for a SAW sensor. Modifying the shaft to locally reduce the strain causes an increase in radial space required. Some components, such as flexplates, are designed to move axially relative to the adjacent fixed structure. Consequently, it is difficult to provide a small, consistent air gap between a rotating signal ring and a stationary signal ring to enable efficient communication with the sensor. Some transmission components have an inconsistent relationship between strain and torque, making them less suitable for torque sensors. For example, the strain at a particular location on a ring gear depends upon the relative position of the meshing planet gears at the moment.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A planetary gear set comprising:
   a carrier having a rear plate welded to a front plate, the rear plate and front plate supporting a plurality of planet shafts;
   a plurality of planet gears supported for rotation about the plurality of planet shafts;
   a ring gear and a sun gear each in continuous meshing contact with each of the plurality of planet gears; and
   a surface acoustic wave sensor mounted to the rear plate between adjacent planet shafts on a side opposite the front plate.

2. The planetary gear set of claim 1 wherein the sensor is mounted radially inside the weld between the front plate and the rear plate.

3. The planetary gear set of claim 2 further comprising a first signal ring mounted to the rear plate and in electrical communication with the sensor.

4. The planetary gear set of claim 3 wherein the first signal ring is configured to communicate across an air gap with a second signal ring fixed to a non-rotating member.

5. The planetary gear set of claim 1 further comprising an output shaft fixed to the rear plate.

6. A planetary carrier comprising:
   a rear plate configured to support first ends of a plurality of planet shafts;
   a front plate configured to support second ends of the plurality of planet shafts; and
   a surface acoustic wave sensor mounted to the rear plate between adjacent planet shafts on a side opposite the front plate and radially inside a weld joining the front and rear plates.

7. The planetary carrier of claim 6 further comprising a first signal ring mounted to the rear plate and in electrical communication with the sensor.

8. The planetary carrier of claim 7 wherein the first signal ring is configured to communicate across an air gap with a second signal ring fixed to a non-rotating member.

9. The planetary carrier of claim 6 further comprising a plurality of planet gears supported for rotation about the plurality of planet shafts.

10. The planetary carrier of claim 6 further comprising an output shaft fixed to the rear plate.

11. A transmission comprising:
    a planetary gear set having a carrier supported for rotation with respect to a housing and a plurality of planet gears supported for rotation with respect to the carrier;
    a surface acoustic wave sensor affixed to a carrier face between axes of rotation of two adjacent planet gears of the plurality of planet gears; and
    first and second signal rings defining an air gap having a constant thickness, the first ring supported for rotation with the carrier, the second ring fixed to the housing and configured to receive signals from the sensor via the first ring and the air gap.

12. The transmission of claim 11 further comprising an output shaft fixedly coupled to the carrier.

13. The transmission of claim 11 wherein the planetary gear set further comprises:
    a sun gear in continuous meshing engagement with each of the planet gears; and
    a ring gear in continuous meshing engagement with each of the planet gears.

14. The transmission of claim 11 further comprising a controller configured to receive electrical signals from the sensor via the second ring and to adjust signals to a valve body in response.

* * * * *